Oct. 27, 1959 F. G. STEELE 2,910,584

VOTED-OUTPUT FLIP-FLOP UNIT

Filed Aug. 6, 1956 2 Sheets-Sheet 1

INVENTOR.
Floyd G. Steele

BY

Seymour M. Rosenberg
Attorney.

Oct. 27, 1959 F. G. STEELE 2,910,584

VOTED-OUTPUT FLIP-FLOP UNIT

Filed Aug. 6, 1956 2 Sheets-Sheet 2

INVENTOR.
Floyd G. Steele

BY

Seymour M. Rosenberg
Attorney

United States Patent Office 2,910,584

Patented Oct. 27, 1959

2,910,584

VOTED-OUTPUT FLIP-FLOP UNIT

Floyd G. Steele, La Jolla, Calif., assignor to Digital Control Systems, Inc., La Jolla, Calif.

Application August 6, 1956, Serial No. 602,207

5 Claims. (Cl. 250—27)

The present invention relates to circuits for increasing the reliability of electronic digital computing or switching machines and more particularly to a voted-output flip-flop unit employing three flip-flop circuits and having a reliability of operation far exceeding the reliability of a conventional flip-flop circuit.

Electronic digital computing or switching machines as they are commonly constructed comprise large numbers of flip-flop circuits ordinarily connected together in such manner that the failure of any individual flip-flop is sufficient to destroy the operation of the total machine. Assuming, for purposes of example, identical probabilities of failure for each of the flip-flops in a machine and that there are $n$ such flip-flops in the total machine, then it may be said that the probality of failure of the total machine is approximately $n$ times greater than the probability of failure of an individual flip-flop. Thus, for example, if there is a statistical expectation that a flip-flop will fail in 3,000 hours and there are 100 flip-flops in the machine, then it may be expected that the machine as a whole will fail at least once in 30 hours. When one realizes that machines are now being projected which utilize as many as 1,000 or more flip-flops, it can be seen that a very real reliability crisis is developing.

It is therefore becomes extremely important that the reliability of flip-flop circuits be greatly increased. Basically, a flip-flop circuit is a device having two internal states and selectively responsive to applied input signals for switching to either state, the device being operable for producing a bivalued output signal having one value when the circuit is in one of its internal states and a second value when the flip-flop circuit is in the other of its internal states.

The most common and widely used flip-flop circuit is of the Eccles Jordan type in which two amplifiers are intercoupled so that only one of the amplifiers can be conducting, the conduction states of the two amplifiers being reversed upon application of a signal to an appropriate amplifier input. A high or low level voltage output signal is derived from an appropriate point on one of the amplifiers. In another type of flip-flop circuit only a single amplifier is used which is either oscillating or not oscillating. Another type of flip-flop circuit which is also utilized is essentially a one digit delay line having its output connected through an amplifier back to its input, a single electrical signal either circulating or not circulating through the delay line. In addition a wide variety of flip-flop circuits have been constructed using magnetic components in which output signals are derived from a magnetic core in accordance with the direction of magnetization of the core.

Although some of these types of flip-flop circuits are probably inherently capable of greater reliability than others, it appears that the limiting reliability to be expected from the very best of these circuits will not match the very severe reliability requirements that must now be met, and that therefore another approach must be found to improving flip-flop reliability.

According to the basic concept of the present invention, vastly greater reliability is obtained by substituting for each flip-flop circuit in a machine a flip-flop unit which comprises three independently operating flip-flop circuits, input signals being applied to corresponding input terminals of the three flip-flops so that if all of the flip-flops are working properly their output signals will be identical. The flip-flop unit of the present invention further includes a gating circuit, hereinafter referred to as a "voting circuit," which receives an output signal from each of the flip-flop circuits and combines these signals to produce a bivalued resultant voted output signal whose value is determined by agreement between any two of the three flip-flop circuits.

For example, assume that in accordance with an applied input signal all three of the flip-flop circuits are supposed to be in one state in which they produce high level output signals and also assume that one of the flip-flop circuits has failed so that it produces an erroneous low level output signal. The voting circuit then receives two correct high level and one erroneous low level output signal and therefore, in accordance with the two-out-of-three rule indicated hereinbefore, the voting circuit produces a correct high level resultant voted-output signal. Similarly if the voting circuit receives two correct low level signals and one incorrect high level signal, the voting circuit operates to produce a resultant correct low level signal. It is, therefore, seen that simultaneous failure of at least two of the three flip-flop circuits is required before an erroneous resultant signal will be produced. As a result of this mode of operation, the reliability of the flip-flop unit of the present invention far exceeds the reliability of the individual flip-flop circuits of which it is comprised.

To illustrate this fact, let the symbol $p_c$ designate the probability of failure of an individual flip-flop circuit, and the symbol $p_u$ designate the probability of failure of the flip-flop unit of the present invention. There are four ways in which the failure of flip-flop circuits can destroy the operation of the flip-flop unit. In three of these ways a combination of two flip-flop circuits must fail simultaneously, the probability of this being $3p_c^2$. In the fourth way all three of the flip-flop circuits must fail simultaneously, the probability of this being $p_c^3$. The probability of failure $p_u$ of the flip-flop unit is therefore defined by the following equation:

$$p_u = 3p_c^2 + p_c^3 \qquad (1)$$

To illustrate the significance of Equation 1, if the life of an individual flip-flop is 3,000 hours (as was assumed before, then it can be said that $$p_c = \frac{1}{3000}$$

and therefore $$p_u = 3\left(\frac{1}{3000}\right)^2 + \left(\frac{1}{3000}\right)^3$$

Ignoring the term $$\left(\frac{1}{3000}\right)^3$$

which is too small to materially affect the result, and reducing the above equation there is obtained:

$$p_u = \frac{1}{3,000,000}$$

In other words, under the assumption made hereinabove if the expected life of a conventional flip-flop circuit is 3000 hours then the expected life of the flip-flop unit of the present invention will be of the order of three million hours, this representing a ratio of improvement in reliability of 1000. Not only will the individual flip-flop unit of which a computing or switching machine is comprised be 1000 times as reliable, but also this same 1000 to 1 improvement in reliability will be displayed by the computing or switching machine in its overall operation, since the overall reliability of such a machine is directly proportional to the reliability of its elemental components.

Those skilled in the art will of course recognize that in making the above calculation, there has been ignored any possible decrease in reliability of a flip-flop unit caused by the addition of the voting circuit. It will be realized that the true reliability of the flip-flop unit of the present invention is a function both of the reliability of the flip-flop circuits of which it is comprised and also of the reliability of the voting circuit. It is shown in the following specification that even the most elementary and basic form of voting circuit exhibits relatively high reliability and that by suitable design in accordance with the invention the voting circuit can be made so highly reliable that it can be considered as not detracting at all from the reliability of the flip-flop unit as calculated hereinabove.

In addition to its inherently high reliability the flip-flop unit of the present invention has certain other advantages which are not immediately obvious. One important advantage is that it is very easy to check the flip-flop unit while it is in operation to discover if any one of the three flip-flop circuits contained therein has failed. Since all three flip-flop circuits operate independently of each other it is possible (using an oscilloscope for example) to compare the three separate output signals produced by them and to determine if any one of the output signals differs from the other two, indicating that the corresponding flip-flop circuit has failed. In this manner faulty components of a machine can readily be found and replaced by routine checks, while the machine is running and before the defective component, even though it may have completely failed, has been able to cause incorrect operation of the machine.

It is clear therefore that a machine constructed with flip-flop units according to the present invention could be adequately serviced and repaired through infrequent checks by relatively unskilled personnel. Defective flip-flop circuits could be infallibly located without any knowledge at all of the organization of the machine. In contrast, in conventional prior art machines any defective component causes errors to be propagated throughout the machine and it is only through use of special checking programs and through thorough understanding of machine operation that a defective component can be located.

It is therefore an object of the present invention to provide a voted-output flip-flop unit which is several orders of magnitude more reliable than conventional flip-flop circuits.

It is another object of the present invention to provide a voted-output flip-flop unit which comprises three independently operating flip-flop circuits and a voting circuit for producnig an output signal corresponding to agreement between any two of the flip-flop circuits.

It is yet another object of the present invention to provide a highly reliable flip-flop unit comprising three flip-flop circuits producing corresponding output signals and a voting circuit responsive to the output signals for producing a resultant signal agreeing with any two of the output signals.

It is a further object of the present invention to provide a flip-flop unit wherein associated logical diode gating circuits have such high inherent reliability that they substantially do not detract from the reliability of the flip-flop unit.

The novel features which are believed to be characteristic of the invention, both as to its organization and method of operation together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Figure 3A:
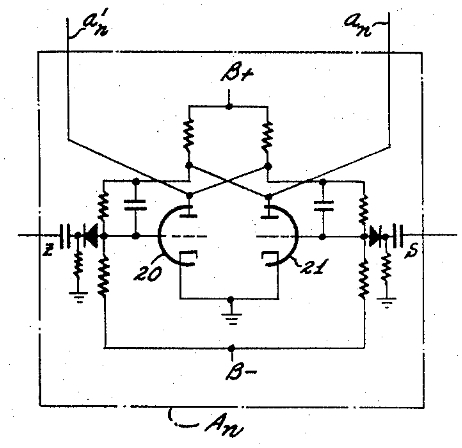
Figure 3B:
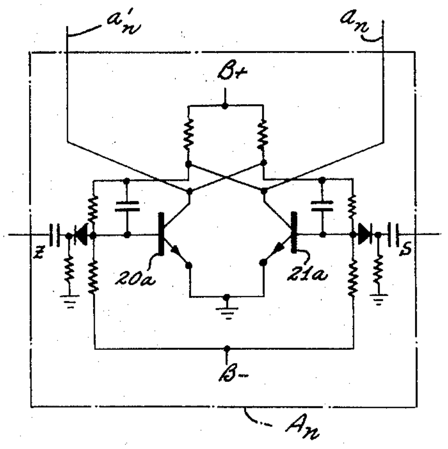
Figure 4A:
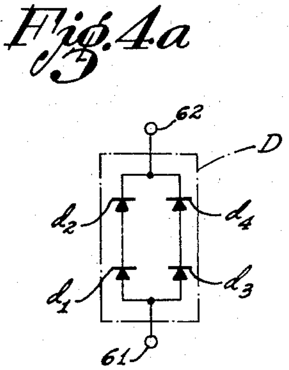
Figure 4B:
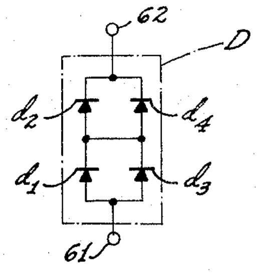

Figs. 3*a* and 3*b* are circuit diagrams of conventional flip-flop circuits mechanized respectively with vacuum tube and transistor amplifiers;

Figs. 4*a* and 4*b* are circuit diagrams of two forms of a highly reliable diode rectifier unit which may be utilized in the practice of the present invention.

Figure 1:
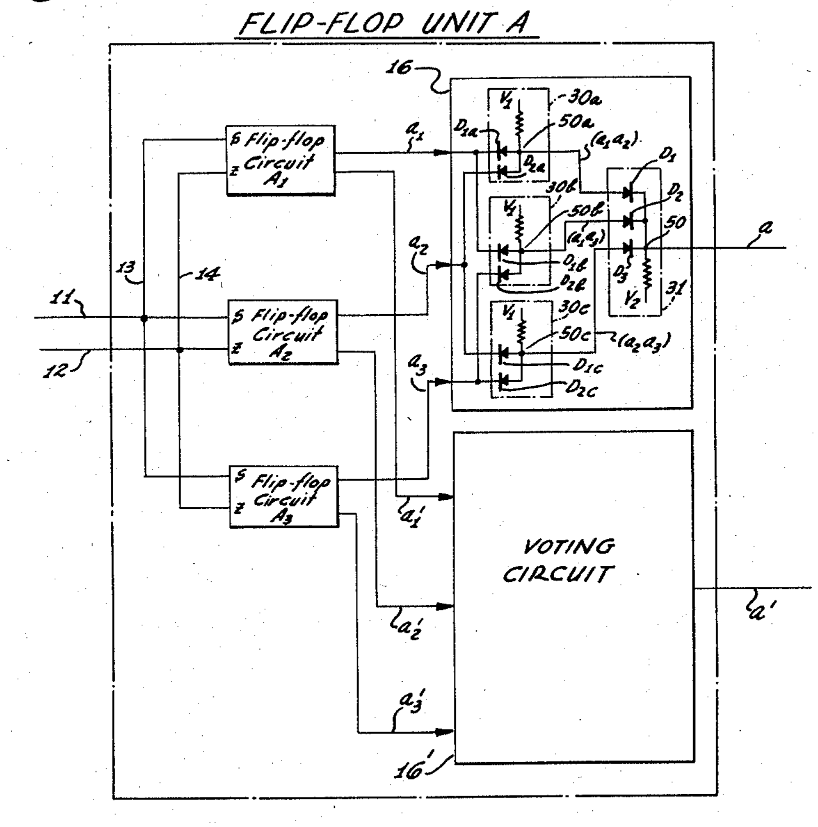
Fig. 1 is a partly block, partly circuit diagram of a voted-output flip-flop unit according to the present invention.

Referring now to the drawings wherein like parts are similarly designated throughout the several views there is shown in Fig. 1 in accordance with the invention a partly block, partly circuit diagram of a highly reliable voted-output flip-flop unit designated flip-flop unit A which is operable for changing its stable state in response to input signals applied to input conductors 11 and 12 and for producing a bivalued voted-output signal $a$ (and also a complementary signal $a'$) whose value is representative of the stable state of the flip-flop unit. As shown in Fig. 1, flip-flop unit A includes three conventional flip-flop circuits designated $A_1$, $A_2$ and $A_3$ respectively, each flip-flop circuit being independently settable either to a first state (designated the 1 state) or a second internal state (designated the 0 state) in response to application of input signals thereto; and producing corresponding bivalued output signals designated $a_1$, $a_2$ and $a_3$ respectively (and also corresponding complementary signals $a_1'$, $a_2'$, and $a_3'$) whose values are representative of the states of the corresponding flip-flop circuits. Flip-flop unit A also includes conductors 13 and 14 interconnecting the input conductors 11 and 12 and the inputs of flip-flop circuits $A_1$ and $A_3$, conductors 11 and 13 being directly connected to flip-flop circuit $A_2$ so that each input signal is applied to all three of the flip-flop circuits in such manner as to set all three of the flip-flop circuits to the same state. The flip-flop unit further includes voting circuit 16 which receives bivalued output signals $a_1$, $a_2$ and $a_3$ produced by the three flip-flop circuits and combines these output signals to produce a bivalued voted-output signal, designated $a$, whose value is representative of like states of any two of the flip-flop circuits.

Thus, for example, if the states of flip-flop circuits $A_1$ and $A_2$ (or of $A_1$ and $A_3$, or of $A_2$ and $A_3$) are the same (both 1 or both 0) then the value of voted-output signal $a$ produced by voting circuit 16 will be such as to represent the common state of these two flip-flop circuits. Thus signal $a$ may have, as will be described, a high voltage level to represent a common 1 state of the two agreeing flip-flop circuits and a low voltage level to represent a common 0 state of the two agreeing flip-flop circuits or may represent the 1 and 0 states in other ways, as will be appreciated by those skilled in the art.

As shown in Fig. 1, complementary signals $a_1'$, $a_2'$ and $a_3'$ are applied to a second voting circuit 16' which combines these signals in similar manner to produce the voted-output signal $a'$ which is complementary to signal $a$. Since the two voting circuits shown in Fig. 1 may be identical in structure, and operation, the operation of the voting circuit will be described only in connection with the formation of signal $a$.

It will be recognized in view of the foregoing explanation that if all three flip-flop circuits $A_1$, $A_2$ and $A_3$ are operating properly, their states will be identical and, therefore, the value of voted-output signal $a$ produced by voting circuit 16 will represent the common state of the three flip-flop circuits. Suppose however that one of the flip-flop circuits fails so that it is in an incorrect state at a particular time and therefore produces an erroneously valued output signal. Since the flip-flop circuits operate independently of each other the remaining two flip-flop circuits, in response to the input signals, will be set to a common correct state and will produce correctly valued output signals. Voting circuit 16 in response to these output signals will therefore produce a voted-output signal representing the common or like state of the two correct flip-flop circuits. It is thus seen that failure of one of the three flip-flop circuits does not impair the operation of the flip-flop unit of the present invention and that actually at least two of the flip-flop circuits must fail simultaneously before the flip-flop unit can produce an erroneous output signal. As explained hereinbefore because of this mode of operation the reliability of the flip-flop unit of the present invention is several orders of magnitude greater than the reliability of an individual flip-flop circuit.

Referring again to Fig. 1, it will be assumed for purposes of explanation that flip-flop circuits $A_1$, $A_2$ and $A_3$ are conventional Eccles-Jordan type trigger circuits each of which has a set (S) input and a zero (Z) input each flip-flop being settable to a first (1) state or a second (0) state in response to signals selectively applied to its set (S) and zero (Z) inputs respectively, and operable for reversing state when signals are simultaneously applied to both of its inputs. The flip-flop circuit produces a first output signal which has a high voltage level when the flip-flop circuit is in its 1 state and a low voltage level when the flip-flop circuit is in its 0 state, and a second output signal complementary to the first having low and high voltage levels, respectively, when the flip-flop circuit is in its 1 and 0 states.

Although such flip-flop circuits are exceedingly well-known in the art, for purposes of clarity there is shown in Fig. 3*a* a typical Eccles-Jordan form of vacuum tube flip-flop circuit designated $A_n$ which is seen to comprise two triodes 20 and 21, each connected as an amplifier but having their plate and grid circuits cross-connected so that in operation either triode 20 or triode 21 but not both may be conductive. Application of a negative signal to the set (S) input and thence to the grid of triode 21 causes triode 21 to become non-conductive and triode 20 to become conductive (this being termed the "1" state of the flip-flop circuit) while application of a negative pulse to the zero (Z) input will place the flip-flop circuit in its "0" state. Output signal $a_n$ derived from the plate of triode 21 has high and low voltage levels, respectively, when the flip-flop circuit is in its 1 and 0 states while output signal $a_n'$ derived from the plate of triode 20 is complementary thereto and has low and high voltage levels, respectively, when the flip-flop circuit is in its 1 and 0 states.

In Fig. 3*b* there is shown for purposes of additional clarification, a very similar Eccles-Jordan type of flip-flop circuit which is mechanized with transistor amplifying elements 20*a* and 21*a* rather than vacuum tube triodes such as shown in Fig. 3*a*. In other respects the structure and operation of the flip-flop circuits shown in Figs. 3*a* and 3*b* are substantially identical.

Referring again now to Fig. 1 it is seen that conductor 11 is connected, either directly or through conductor 13, to the set (S) inputs of each of the flip-flop circuits and that conductor 12 is connected, either directly or through conductor 14, to the zero (Z) inputs of each of the flip-flop circuits. Thus, it is clear that application of an input signal to input conductor 11 will have the effect of causing all three flip-flop circuits (if they are all operating properly) to be set to their 1 states while application of an input signal to conductor 12 will have the effect of setting all three of the flip-flop circuits to their 0 states. Simultaneous application of input signals to conductors 11 and 12 will cause all three of the flip-flop circuits to reverse state. Output signals $a_1$, $a_2$ and $a_3$ respectively produced by flip-flop $A_1$, $A_2$ and $A_n$ will (for the assumed type of flip-flop circuit) have high voltage levels when the corresponding flip-flop circuits are in the 1 state and low levels when the corresponding flip-flop circuits are in the 0 state and signals $a_1'$, $a_2'$ and $a_3'$ have voltage levels complementary thereto.

As shown in Fig. 1, signals $a_1$, $a_2$ and $a_3$ are received by voting circuit 16 and combined thereby to produce voted-output signal $a$ whose voltage level is determined by agreement between the voltage levels of any two of signals $a_1$, $a_2$ and $a_3$. Thus if any pair of signals ($a_1$ and $a_2$, or $a_1$ and $a_3$, or $a_2$ and $a_3$) have the same voltage levels, signal $a$ will have a voltage level agreeing with the like-valued pair.

As illustrated in Fig. 1 voting circuit 16 includes three logical gates 30*a*, 30*b* and 30*c*, each receiving a different pair of the signals $a_1$, $a_2$, $a_3$ and producing corresponding resultant bivalued signals in accordance with a predetermined logical gating operation. Voting circuit 16 also including a fourth logical gating circuit 31 coupled to each of the logical gates 30*a*, 30*b* and 30*c* for combining the resultant signals produced thereby in accordance with a second logical gating operation to produce the bivalued voted-output signal.

In the specific embodiment of voting circuit 16 shown in Fig. 1, gates 30*a*, 30*b*, and 30*c* are conventional logical "and" gates receiving the pairs of signals $a_1$ and $a_2$, $a_1$ and $a_3$, $a_2$ and $a_3$, respectively, and combining these signals to produce corresponding resultant signals ($a_1 a_2$), ($a_1a_3$) and ($a_2a_3$) in accordance with the logical "and" operations; and gate 31 is a logical "or" gate which receives these resultant signals and combines them to produce voted-output signal $a$. A logical "and" gate as is well-known to those skilled in the art produces a high level output signal only if all the input signals applied thereto are high and otherwise produces a low level signal while a logical "or" gate produces a high level signal if any of the input signals applied thereto is high. Thus "and" gate 30*a* shown in Fig. 1 produces the resultant signal ($a_1a_2$) having a high level only when signals $a_1$ and $a_2$ are both high, gates 30*b* and 30*c* operating similarly in producing the resultant signals ($a_1a_3$) and ($a_2a_3$); while "or" gate 31 is operable for combining these three resultant signals to produce voted-output signal $a$ having a high level only when any of the signals ($a_1a_2$) or ($a_1a_3$) or ($a_2a_3$) is high.

Voted-output signal $a$ produced by circuit 16 may therefore be defined in terms of signals $a_1$,$a_2$ and $a_3$ by the following Boolean logical equation:

$$a=a_1a_2+a_1a_3+a_2a_3 \qquad (2)$$

where each (+) symbol indicates that the logical "or" operation is to be performed upon the signals combined thereby and the absence of a (+) indicates that the logical "and" operation is to be performed upon the signals combined thereby.

Figure 2:
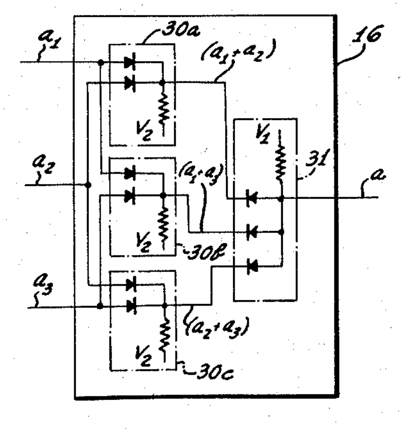
Fig. 2 is a circuit diagram of a modified embodiment of a voting circuit utilized in the flip-flop unit shown in Fig. 1.

Those skilled in the art will know that by manipulating Equation 2 in accordance with the rules of logical algebra, one can obtain a very large number of equivalent expressions for signal $a$, and thereby define the structure of many alternative embodiments of voting circuit 16. One preferred alternative embodiment is that shown in Fig. 2, which might be termed the anti-symmetrical circuit to that shown in Fig. 1 since in the embodiment shown in Fig. 2, each "and" gate is replaced by an "or" gate and each "or" gate is replaced by an "and" gate. Thus as shown in Fig. 2, gates 30*a*, 30*b* and 30*c* are each "or" gates receiving signals $a_1$ and $a_2$, $a_1$ and $a_3$, and $a_2$ and $a_3$ respectively and producing the corresponding output signals ($a_1+a_2$), ($a_1+a_3$) and ($a_2+a_3$). In addition as shown in Fig. 2, gate 31 is an "and" gate receiving the signals ($a_1+a_2$), ($a_1+a_3$) and ($a_2+a_3$) and combining these signals in accordance with the logical "and" operation to produce signal $a$ defined by the following logical equation:

$$a=(a_1+a_2)(a_1+a_3)(a_2+a_3) \qquad (3)$$

The identity between logical Equations 2 and 3 can be readily established in the following manner by writing the two expressions as an identity and proving the identity through straightforward logical manipulation of the expression of Equation 3:

$$a_1a_2+a_1a_3+a_2a_3=(a_1+a_2)(a_1+a_3)(a_2+a_3) \quad (4)$$
$$=(a_1^2+a_1a_3+a_1a_2+a_2a_3)(a_2+a_3) \quad (5)$$

Since $a^n=a$, and $a+ax=a$, the expression on the right of Equation 5 reduces to:

$$=(a_1+a_2a_3)(a_2+a_3)$$
$$=a_1a_2+a_1a_3+a_2^2a_3+a_2a_3^2$$
$$=a_1a_2+a_1a_3+a_2a_3+a_2a_3 \quad (6)$$

and since $a+a=a$ the expression on the right of Equation 6 reduces to:

$$=a_1a_2+a_1a_3+a_2a_3 \quad (7)$$

thereby establishing the equivalence of logical Equations 2 and 3 and thus establishing the equivalence of function between the voting circuits shown in Figs. 1 and 2 respectively.

It has been stated before that voting circuits of the type described exhibit relatively high reliability and that by suitable design in accordance with the invention, the voting circuit can be made so highly reliable that it can be considered as not detracting at all from the reliability of the flip-flop unit as calculated hereinabove. Consider for example the embodiment of voting circuit 16 shown in Fig. 1.

As shown in Fig. 1, "and" gate 30*a* comprises two diode rectifiers $D_{1a}$ and $D_{2a}$ to whose cathodes the signals $a_1$ and $a_2$ are respectively applied, the anodes of these rectifiers being connected in common to a lower terminal 50*a* of a resistor whose upper terminal is connected to a source of relatively high voltage $V_1$. In the operation of "and" gate 30*a* if signal $a_1$ or signal $a_2$ is low, the associated diode $D_{1a}$ or $D_{2a}$ will be strongly forward biased so that it remains strongly conductive thereby effectively establishing a short circuit between the source of signal $a_1$ or $a_2$ and terminal 50*a*. Thus the signal at terminal 50*a* (signal $a_1a_2$) will remain low if either signal $a_1$ or $a_2$ is low and will go high only when $a_1$ and $a_2$ are both high. "And" gates 30*b* and 30*c* are similarly constructed utilizing diode rectifiers $D_{1b}$, $D_{2b}$ and $D_{1c}$, $D_{2c}$ respectively. As further shown in Fig. 1 "or" gate 31 comprises three diode rectifiers $D_1$, $D_2$ and $D_3$ whose cathodes are connected in common to upper terminal 50 of a resistor whose lower terminal is connected to a source of relatively low voltage $V_2$, the signals $(a_1a_2)$, $(a_1a_3)$ and $(a_2a_3)$ being applied respectively to the cathodes of rectifiers $D_1$, $D_2$ and $D_3$. If any of these signals has a high voltage level, the associated diode rectifier will be forward biased (conductively biased) so that the low voltage level will be impressed upon terminal 50. Thus signal $a$ at terminal 50 will normally be low (because of the effect of the low voltage $V_2$) and will be high only if one of signals $(a_1a_2)$ or $(a_1a_3)$ or $(a_2a_3)$ is high.

With the structure and operation of the "and" and "or" gates of voting circuit 16 (as shown in Fig. 1) clearly in mind, consider now the relative reliability of the voting circuit. Assume that the reliability of the resistors and connectors contained therein is so high that consideration of them can safely be neglected, the reliability of the circuit therefore being mainly determined by the effect upon circuit operation of open-circuiting of the diode rectifiers contained therein.

If it is assumed that signals $a_1$, $a_2$ and $a_3$ supplied to the voting circuit are correct (that all of the flip-flops are operating properly) then it will be clear that under these conditions short-circuiting of diodes will not impair circuit operation at all since the short-circuited diode or diodes will merely serve to directly connect a correct signal from the input of a gate to the output of a gate. Furthermore insofar as open-circuiting of diodes is concerned, it should be clear that open-circuiting of a single diode will not impair operation but that instead all the diodes in a gate must open-circuit simultaneously before operation will be impaired. In a two input "and" gate (such as gates 30*a*, 30*b* and 30*c* in Fig. 1) the opening of both diodes in the gate is required before the gate output will be maintained permanently high while in a three input "or" gate (such as gate 31 in Fig. 1), open-circuiting of all three diodes must occur before the gate output will be held low. It is thus conceivable that voting circuit 16 shown in Fig. 1 might have five open-circuited diodes and still produce a correct output signal if all of the input signals thereto are correct. A similar demonstration can be made for the embodiment of voting circuit 16 shown in Fig. 2.

Consider next that one of the input signals applied to the voting circuit, for example, signal $a_2$ is incorrect, the corresponding flip-flop circuit $A_2$ having failed. A number of diodes can still open-circuit or short-circuit without impairing operation. For example, considering shorting of diodes, if signal $a_2$ is incorrect, only short-circuiting of those diodes ($D_{2a}$, $D_{1c}$, $D_1$ and $D_3$) in series with the signal is deleterious and the remaining five diodes ($D_{1a}$, $D_{1b}$, $D_{2b}$, $D_{2c}$ and $D_2$) can short-circuit without affecting operation. Considering open-circuiting of diodes, it is clear that an open-circuited diode will not impair operation of a gate unless the incorrect signal ($a_2$) is an input to all of the other diodes of the gate. Thus with signal $a_2$ being incorrect, a correct output signal will still be obtained even though some or even all but one of the six diodes $D_{2a}$, $D_{1c}$, $D_{1b}$, $D_{2b}$, $D_1$ or $D_3$ are open-circuited.

Although relatively high reliability can be obtained by using the voting circuits of the present invention as they have been presented above, without modification, there are however some applications in which such extremely high reliability is required that it is desirable to construct the voting circuits, or other gating circuits, so that they are still further independent of short-circuiting or open-circuiting of diodes. In such applications it is desirable to replace the individual diode rectifiers utilized with four-element diode rectifier units of the type shown in Figs. 4*a* and 4*b*.

In Fig. 4*a* there is shown a diode rectifier unit D which comprises four individual diode rectifiers $d_1$, $d_2$, $d_3$ and $d_4$ and is operable for conducting current unidirectionally from an input terminal 61 to an output terminal 62. Diode $d_1$ has its anode connected to input terminal 61 and its cathode connected to the anode of diode $d_2$ which has its cathode connected to output terminal 62. Diode $d_3$ also has its anode connected to input terminal 61 and its cathode connected to the anode of diode $d_4$ which has its cathode connected to output terminal 62. Rectifier unit D thus includes two branches, one branch being a series connection of diodes $d_1$ and $d_2$ between the input and output terminals and the other branch being a series connection of diodes $d_3$ and $d_4$ between the input and output terminals. It is clear from a consideration of Fig. 4*a* that before rectifier unit D can fail, there must be an opening of two diodes in unlike branches or a shorting of two diodes in the same branch. Thus it is apparent that the reliability of rectifier unit D is far higher than the reliability of an individual diode rectifier and therefore by substituting diode unit D for each individual diode rectifier of voting circuit 16, enormously high reliability of operation may be obtained.

A modified form of rectifier unit D is shown in Fig. 4*b* in which the cathodes of diodes $d_1$ and $d_3$ (and hence the anodes of diodes $d_2$ and $d_4$) have been connected together. In operation this form of rectifier unit D differs from that shown in Fig. 4*a* in that it is more independent of open circuits while being less independent of short circuits. For example if in Fig. 4*b*, diode $d_1$ were open-circuited, only open-circuiting of $d_3$ (alone) can stop operation; while in Fig. 4*a* if $d_1$ were open-circuited, open-circuiting of either $d_3$ or $d_4$ would stop operation of the unit.

In the same way, referring again to Fig. 4*b*, if $d_1$ were shorted, shorting of either $d_2$ or $d_4$ would stop operation, while in Fig. 4*a*, if $d_1$ were shorted, only shorting of $d_2$ (alone) would stop correct operation of the unit. It is thus clear that the choice for a particular application between the embodiments of Figs. 4*a* and 4*b* would be determined by analysis of the relative probabilities of open-circuiting or short-circuiting of diodes.

What is claimed as new is:

1. A voted-output flip-flop unit comprising: three independently operable electronic bistable flip-flop circuits having corresponding input terminals and output terminals and independently operable in response to application of input signals to said corresponding input terminals for producing like-valued bivalued output signals at said corresponding output terminals; input means for applying input signals to corresponding input terminals of said three flip-flop circuits; and a voting circuit connected to said output terminals for receiving the independent output signals produced by said three flip-flop circuits and combining said independent output signals to produce a bivalued voted-output signal having a value corresponding to like values of any two of the independent output signals, whereby failure of any one of the flip-flop circuits does not affect the value of the voted-output signal.

2. The voted-output flip-flop unit defined by claim 1 wherein each flip-flop circuit has a "set" input terminal and a "zero" input terminal and a first output terminal, each flip-flop circuit being operable in response to application of an input signal to its "set" or "zero" input terminals respectively for producing at its first output terminal a bivalued output signal having a corresponding first or second value; and wherein said input means comprises a first conductor commonly connected to each of said "set" input terminals and a second conductor commonly connected to each of said "zero" input terminals.

3. The voted-output flip-flop unit defined by claim 1 wherein said three output signals of said three flip-flop circuits are bivalued singals $a_1$, $a_2$ and $a_3$ respectively, each having a first or second voltage level in accordance with the conditon of the corresponding flip-flop circuit; and wherein said voting circuit comprises a plurality of logical diode "and" gates and "or" gates, coupled to said flip-flops for combining said signals $a_1$, $a_2$ and $a_3$ in accordance with the Boolean logical functions $S=a_1a_2+a_1a_3+a_2a_3$ to form a bivalued voted-output signal S having a first voltage level whenever any two of the three signals $a_1$, $a_2$ and $a_3$ are at their first voltage levels.

4. A voted-output flip-flop unit immediately responsive to input signals for producing corresponding bivalued voted-output signals, said unit comprising: three independently operable electronic flip-flop circuits, each having first and second input terminals and first and second output terminals and being independently settable to a first or second internal state in response to application of input signals to said first or second input terminals, respectively, each flip-flop circuit including apparatus responsive to application of an input signal for immediately producing a bivalued output signal at said first output terminal whose value is representative of the state of the flip-flop circuit and for immediately producing a complementary bivalued output signal at said second output terminal; means for applying each input signal to like input terminals of all three of the flip-flop circuits so as to set all three of the flip-flop circuits to the same internal state; a voting circuit coupled to output terminals of each of the three flip-flop circuits for combining said bivalued output signals to produce a bivalued voted-output signal whose value is representative of the like internal state of any two of the three flip-flop circuits, whereby failure of any one of the flip-flop circuits does not affect the value of the voted-output signal.

5. The voted-output flip-flop unit defined by claim 4 wherein said voting circuit comprises three logical gating circuits each coupled to a different pair of said flip-flop circuits and operable for combining the corresponding pair of flip-flop output signals to produce a corresponding resultant signal and a fourth logical gating circuit coupled to each of said three logical gating circuits for combining said resultant signals to produce a bivalued voted-output signal.

References Cited in the file of this patent

UNITED STATES PATENTS

| | | |
|---|---|---|
| 1,959,513 | Weyandt | May 22, 1934 |
| 2,123,859 | Winograd | July 12, 1938 |
| 2,193,083 | Winograd | Mar. 12, 1940 |
| 2,567,742 | Stabler | Sept. 11, 1951 |
| 2,628,346 | Burkhart | Feb. 10, 1953 |
| 2,756,329 | Lubkin | July 24, 1956 |
| 2,757,282 | Exner | July 31, 1956 |
| 2,781,968 | Chenus | Feb. 19, 1957 |

OTHER REFERENCES

Arithmetic Operations in Digital Computers, D. Van Nostrand Co., Inc. (1955), by R. K. Richards.